(12) United States Patent
Kim

(10) Patent No.: US 6,948,810 B1
(45) Date of Patent: Sep. 27, 2005

(54) EYEGLASS SET WITH SUNGLASS CLIP

(76) Inventor: Kelly Kim, 4525 San Fernando Rd., Unite E, Glendale, CA (US) 91204

( * ) Notice: Subject to any disclaimer, the term of this patent is extended or adjusted under 35 U.S.C. 154(b) by 0 days.

(21) Appl. No.: 10/895,304

(22) Filed: Jul. 21, 2004

(51) Int. Cl.⁷ .............................................. G02C 7/08
(52) U.S. Cl. ........................... 351/57; 351/47; 351/138
(58) Field of Search .............................. 351/47, 48, 57, 351/58, 124–132, 136–138

(56) References Cited

U.S. PATENT DOCUMENTS 6,742,888 B1    6/2004   Kim

FOREIGN PATENT DOCUMENTS

FR               2564603 A2 * 11/1985 .................. 351/47

* cited by examiner

Primary Examiner—Huy Mai
(74) Attorney, Agent, or Firm—Park & Sutton LLP; John K. Park

(57) ABSTRACT

A multi-purpose eyeglass set comprises base lenses, a base bridge connecting inner portions of the base lenses, a substantially curved support having a mid portion and wing portions extending from each end of the mid portion so that the mid portion is attached to the base bridge, cover lenses, and a cover bridge connecting inner portions of the cover lenses. The cover bridge has a hook extending from a mid portion thereof so that the curved support mid portion is clipped over by the cover bridge hook when required.

20 Claims, 3 Drawing Sheets

US 6,948,810 B1

EYEGLASS SET WITH SUNGLASS CLIP

BACKGROUND OF THE INVENTION

The present invention relates to eyeglasses with a sunglass clip. More particularly, the present invention relates to a multi-purpose eyeglass set incorporated by a pair of base eyeglasses and a pair of cover sunglasses where the cover sunglasses are detachably clipped over the base eyeglasses.

Conventional eyeglasses with a sunglass clip show attachments around rims of the clip to become attached to the base eyeglasses. Although such attachments provide convenience in terms of dual usage without a separate sunglass set, the sunglass clip mechanism produces double or triple adjustments of the cover sunglasses for the attachments, causing inconvenience.

Another disadvantage of the conventional eyeglasses having a sunglass clip is that the sunglass clip is noticeable due to the attachments and the substantial gap between the base glasses and the cover glasses. One of the least welcome factors of the conventional eyeglasses having a sunglass clip would be difficulty applying fashion design to such eyeglass products, because of limitation caused by nuisance attachments of the cover glasses to the base glasses.

SUMMARY OF THE INVENTION

The present invention is contrived to overcome the conventional disadvantages. Accordingly, it is an objective of the present invention to provide an eyeglass system that enables detachable hooking of a cover glass set on a base glass set using bridges thereof. Another objective is to provide an eyeglass system that maximizes adaptability of a cover sunglass set to rimless base eyeglasses. Further objective is to provide an eyeglass system that facilitates custom design while improving comfortability when wearing the eyeglass sets.

To achieve these and other objectives, a multi-purpose eyeglass set comprises base lenses, a base bridge connecting inner portions of the base lenses, a substantially curved support having a mid portion and wing portions extending from each end of the mid portion, wherein the mid portion is attached to the base bridge, cover lenses, and a cover bridge connecting inner portions of the cover lenses. The cover bridge has a hook extending from a mid portion thereof, and the curved support mid portion is clipped over by the cover bridge hook when required.

The curved support mid portion and the cover bridge mid portion are concurrently clipped over by the cover bridge hook when required, and the curved support is formed of an elastic material. The cover bridge hook is defined by a first wall serving as an inner surface of the cover bridge mid portion, a second wall substantially perpendicular to the first wall, and a third wall lowered from the second wall. Here, an angle between the second and third walls is substantially less than a right angle.

For a better performance, the cover lenses are substantially colored, and the substantially colored cover lenses may be darker in color than the base lenses. Also, the cover lenses are substantially identical to the base lenses in lens surface curvature. Alternately, the cover lenses are substantially larger than the base lenses and formed of a polycarbonate material.

In an embodiment, the multi-purpose eyeglass set comprises base lenses, a base bridge connecting inner portions of the base lenses with a boss formed on an inner surface of the base bridge, a substantially curved support having a mid portion and wing portions extending from each end of the mid portion with the curved support mid portion having an opening to be attached to the inner surface of the base bridge such that the boss protrudes through the opening.

In a preferred version, the boss, the curved support mid portion and the cover bridge mid portion are concurrently clipped over by the cover bridge hook when required. Selectively, the cover bridge hook is defined by a first wall serving as the inner surface of the cover bridge mid portion, a second wall substantially perpendicular to the first wall, and a third wall lowered from the second wall in which an angle between the second and third walls is substantially less than a right angle. The third wall produces elasticity relative to the boss when the cover bridge hook clips over the boss and the curved support mid portion. The third wall may be selectively raised from the second wall when required.

Advantages of the present invention are numerous in that: (1) the cover lenses serving as detachable sunglasses introduce an elongate support attached to a cover bridge in a curved format so that the curved support makes a dual performance of standard nose pads and at the same time of an attachment medium between the cover lenses and the base lenses, thereby enhancing usability and marketability; (2) the cover bridge with a hook extension enables a single click attachment of the cover lenses to the base lenses, thereby improving product applicability and users' satisfaction; and (3) elastic characteristics are applied to the hooking attachments of the cover bridge to the base bridge where the boss protruded through the curved support makes a combination elasticity with the extension hook of the cover bridge, thereby improving product reliability and comfortability.

Although the present invention is briefly summarized, the full understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
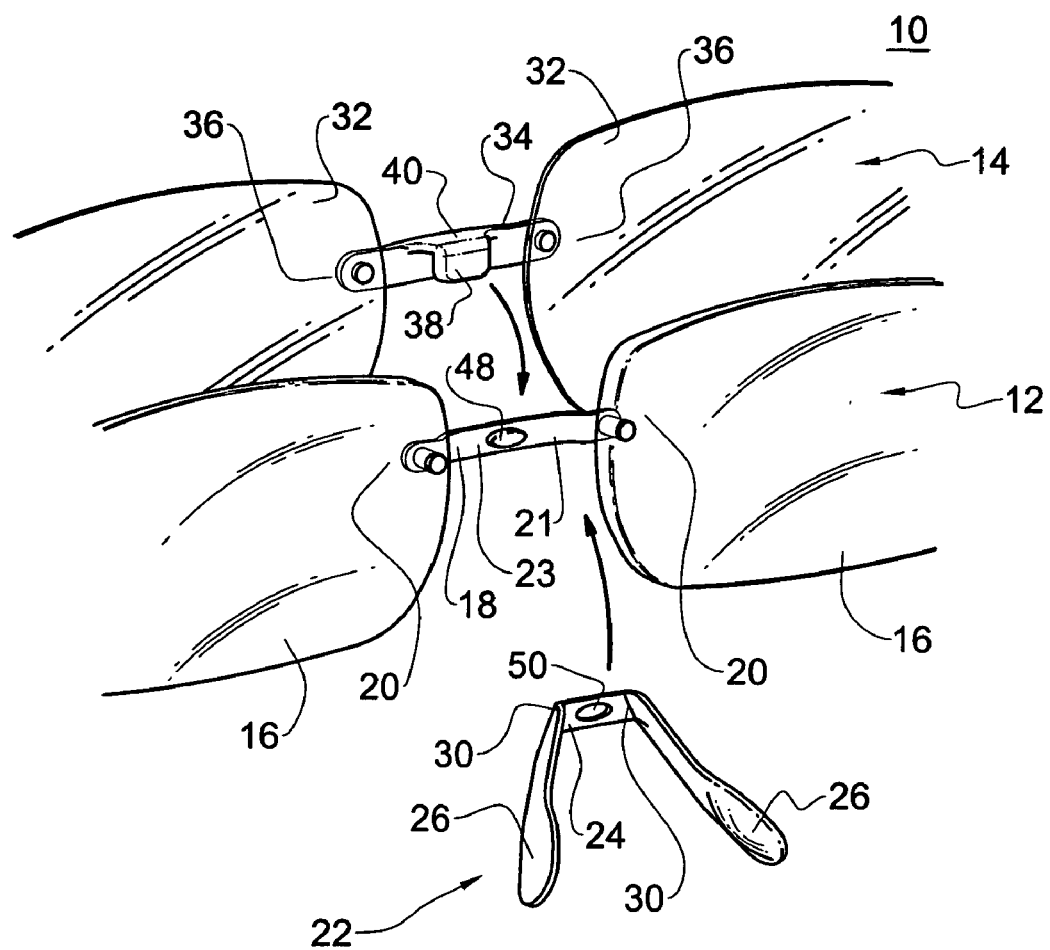
FIG. 1 is an exploded view showing an eyeglass clip system according to a preferred embodiment of the present invention.
Figure 2:
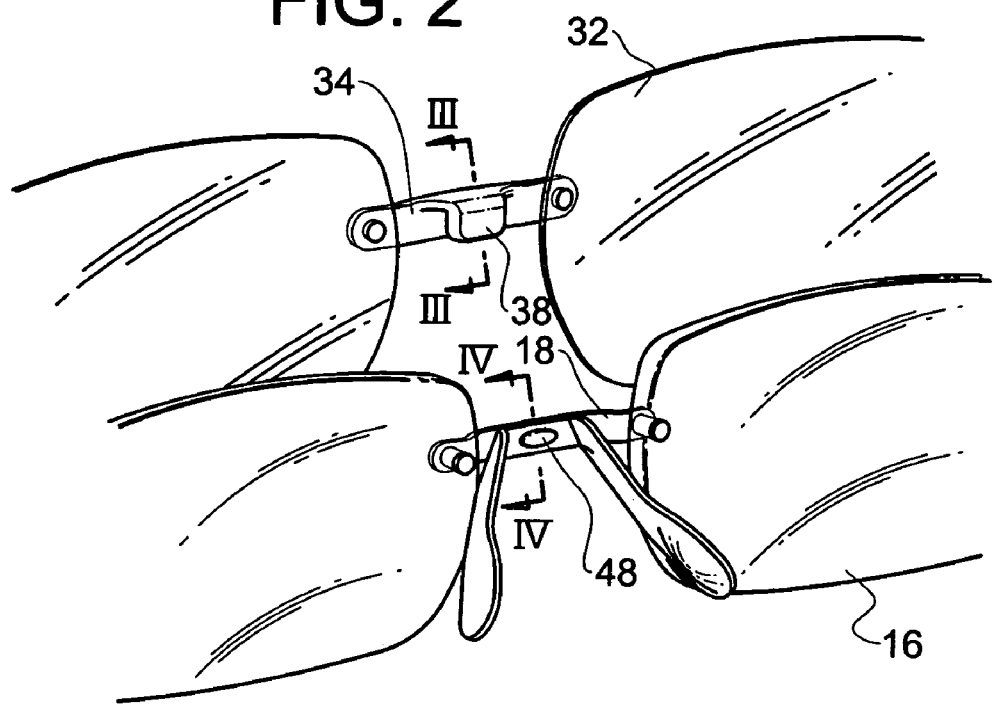
FIG. 2 is a status view showing clipping of a cover glass pair over a base glass pair of the eyeglass according to the present invention.
Figure 3:
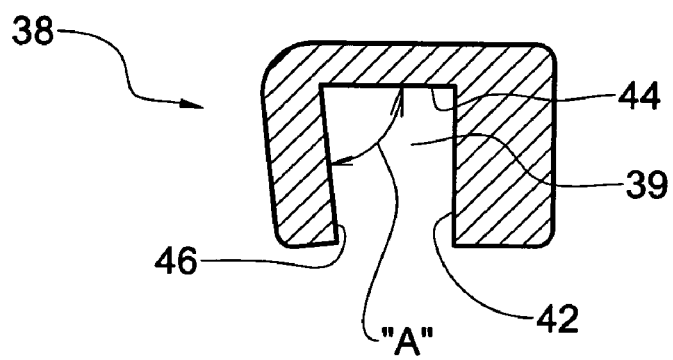
FIG. 3 is a cross-sectional view taken along line III—III in FIG. 2.
Figure 4:
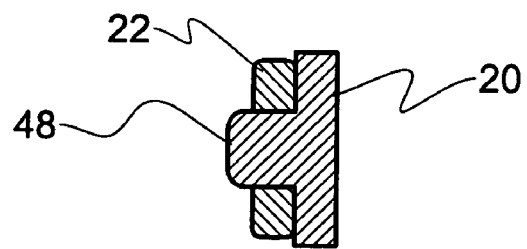
FIG. 4 is a cross-sectional view taken along line IV—IV in FIG. 2.

FIGS. 1 and 2 each show a multi-purpose eyeglass set 10 according to a preferred embodiment of the present invention, and FIGS. 3 and 4 each show a cross-sectional view of the detachable attachment mechanism implemented in the eyeglass set 10.

Figure 5:
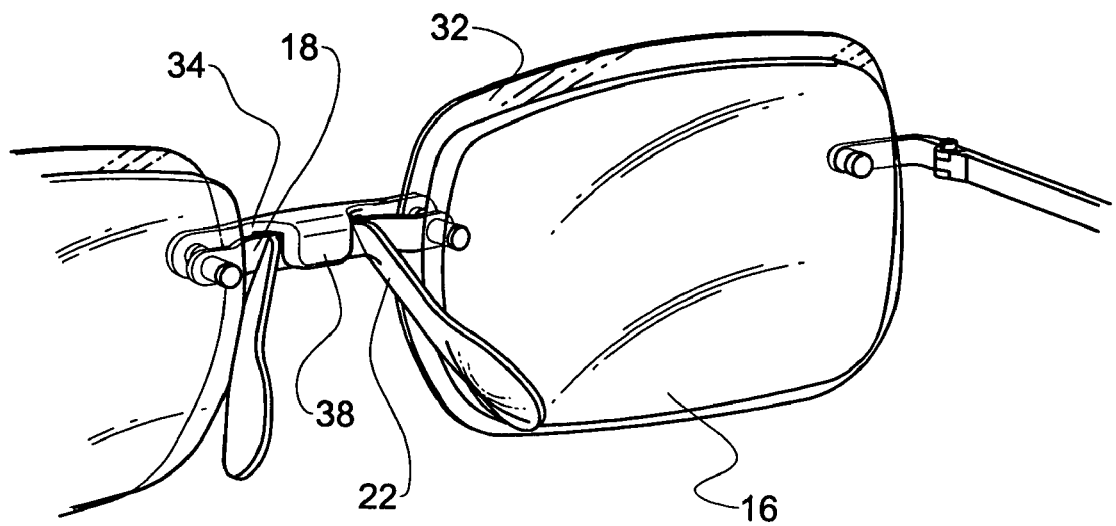
FIG. 5 is a construction view showing the clipped status of the glass pairs according to the present invention.
Figure 6:
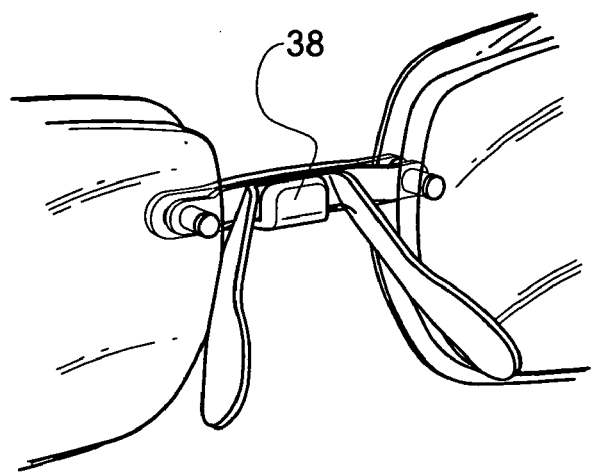
FIG. 6 is a construction view showing another embodiment according to the present invention.

As shown therein, the eyeglass set 10 includes a base glass pair 12 and a cover glass pair 14 serving as detachable sunglasses. Also, FIG. 5 shows the attachment status of the glass pairs 12, 14 and FIG. 6 shows another embodiment of the present invention.

The base glass pair 12 includes base lenses 16 and a base bridge 18. The base bridge 18 is provided to connect inner portions 20 of the base lenses 16. The eyeglass set 10 further includes a substantially curved support 22 having a mid portion 24 and wing portions 26 extending from each end 30 of the mid portion 24. Here, the mid portion 24 of the curved support 22 is attached to the base bridge 18.

Meanwhile, the cover glass pair 14 includes cover lenses 32, and a cover bridge 34. The cover bridge 34 is provided to connect inner portions 36 of the cover lenses 32. For a better performance, it is recommended that the cover bridge 34 have a hook 38 that extends from a mid portion 40 of the cover bridge 34. In this construction, the curved support mid portion 24 is clipped over by the cover bridge hook 38 when required. That is, the hook 38 is formed in a U-shaped mode to reserve a space 39 so that the curved support 22 is detachably received within the space 39.

Selectively, the curved support mid portion 24 and the cover bridge mid portion 40 may be concurrently clipped over by the cover bridge hook 38 when required. Here, it is preferred that the curved support 22 is formed of an elastic material to improve flexibility so that the curved support wings 26 can be adjustably mounted on a user's nose.

As further shown in FIG. 4, the cover bridge hook 38 is defined by a first wall 42 serving as an inner surface of the cover bridge mid portion 40, a second wall 44 substantially perpendicular to the first wall 42, and a third wall 46 lowered from the second wall 44. Here, an angle A between the second and third walls 44, 46 is substantially less than a right angle to improve an elastic holding. Selectively, the third wall 46 may be raised from the second wall 44 so that the hook 38 upwardly receives the curved support mid portion 24 and the base bridge mid portion 20.

In a better mode, the cover lenses 32 are substantially colored, and the substantially colored cover lenses 32 are darker in color than the base lenses 16. Selectively, the cover lenses 32 are substantially identical to the base lenses 16 in lens surface curvature. To improve usability, the cover lenses 32 may be formed substantially larger than the base lenses 16. It is also preferred that the cover lenses 32 are formed of a polycarbonate material that consists of bisphenol A so as to further lightweight the eyeglass set 10. As a reference, the polycarbonate, or specifically polycarbonate of bisphenol A, is known as a clear, transparent plastic used to make lightweight eyeglass lenses.

In an embodiment, a boss 48 is formed on the inner surface 21 of the base bridge 18, and an opening 50 is formed through the curved support mid portion 24 so that the boss 48 protrudes through the opening 50 by the attachment of the curved support 22 onto the inner surface 21 of the base bridge 18, whereby the boss 48 and the curved support mid portion 24 are clipped over by the cover bridge hook 38 when required.

For better functioning of the eyeglass set 10, the boss 48, the curved support mid portion 24 and the base bridge mid portion 23 are concurrently clipped over by the cover bridge hook 38 in a way in which the boss 48, the mid portion 24 of the curved support 22 and the mid portion 23 of the base bridge 18 are clipped within the space 39 defined by the first, second and the third walls 42, 44, 46.

In a best version, the third wall 46 is formed to produce elasticity relative to the boss 48 when the cover bridge hook 38 clips over the boss 48 and the curved support mid portion 24. Selectively, the third wall 46 produces elasticity relative to the boss 48 when the cover bridge hook 38 clips over the boss 48, the curved support mid portion 24 and the base bridge mid portion 23 at the same time. As further shown in FIG. 6, depending on requirements of the hook formation, the third wall 46 may be raised from the second wall 44 and the angle A between the second and third walls 44, 46 remains substantially less than a right angle.

As discussed above, the cover lenses 32 serving as detachable sunglasses introduce the elongate support 22 attached to the base bridge in a curved format so that the curved support 22 makes a dual performance of standard nose pads and at the same time of an attachment medium between the cover lenses 32 and the base lenses 16, thereby enhancing usability and marketability. Further, the cover bridge 34 with a hook extension enables a single click attachment of the cover lens pair 14 to the base lens pair 12, thereby improving product applicability and users' satisfaction.

In addition, elastic characteristics are applied to the hooking attachments of the cover bridge 34 to the base bridge 18 where the boss 48 protruded through the curved support 22 makes a combination elasticity with the extension hook 38 of the cover bridge 34, thereby improving product reliability and comfortability.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A multi-purpose eyeglass set, comprising:
a) base lenses;
b) a base bridge connecting inner portions of the base lenses;
c) a substantially curved support having a mid portion and wing portions extending from each end of the mid portion, wherein the mid portion is attached to the base bridge;
d) cover lenses; and
e) a cover bridge connecting inner portions of the cover lenses, wherein the cover bridge has a hook extending from a mid portion thereof, wherein the curved support mid portion is clipped over by the cover bridge hook when required.

2. The eyeglass set of claim 1 wherein the curved support mid portion and the cover bridge mid portion are concurrently clipped over by the cover bridge hook when required.

3. The eyeglass set of claim 1 wherein the cover bridge hook is defined by a first wall serving as an inner surface of the cover bridge mid portion, a second wall substantially perpendicular to the first wall, and a third wall lowered from the second wall, wherein an angle between the second and third walls is substantially less than a right angle.

4. The eyeglass set of claim 1 wherein the cover lenses are substantially colored, wherein the substantially colored cover lenses are darker in color than the base lenses.

5. The eyeglass set of claim 1 wherein the cover lenses are substantially identical to the base lenses in lens surface curvature.

6. The eyeglass set of claim 1 wherein the curved support is formed of an elastic material.

7. The eyeglass set of claim 1 wherein the cover lenses are substantially larger than the base lenses.

8. The eyeglass set of claim 1 wherein the cover lenses are formed of a polycarbonate material.

9. A multi-purpose eyeglass set, comprising:
a) base lenses;
b) a base bridge connecting inner portions of the base lenses, wherein a boss is formed on an inner surface of the base bridge;
c) a substantially curved support having a mid portion and wing portions extending from each end of the mid portion, wherein the curved support mid portion having an opening is attached to the inner surface of the base bridge such that the boss protrudes through the opening;
d) cover lenses; and
e) a cover bridge connecting inner portions of the cover lenses, wherein the cover bridge has a hook extending from a mid portion thereof, wherein the boss and the curved support mid portion are clipped over by the cover bridge hook when required.

10. The eyeglass set of claim 9 wherein the boss, the curved support mid portion and the base bridge mid portion are concurrently clipped over by the cover bridge hook when required.

11. The eyeglass set of claim 9 wherein the cover bridge hook is defined by a first wall serving as the inner surface of the cover bridge mid portion, a second wall substantially perpendicular to the first wall, and a third wall lowered from the second wall, wherein an angle between the second and third walls is substantially less than a right angle.

12. The eyeglass set of claim 11 wherein the third wall produces elasticity relative to the boss when the cover bridge hook clips over the boss and the curved support mid portion.

13. The eyeglass set of claim 11 wherein the third wall produces elasticity relative to the boss when the cover bridge hook clips over the boss, the curved support mid portion and the base bridge mid portion.

14. The eyeglass set of claim 9 wherein the cover bridge hook is defined by a first wall serving as the inner surface of the cover bridge mid portion, a second wall substantially perpendicular to the first wall, and a third wall raised from the second wall, wherein an angle between the second and third walls is substantially less than a right angle.

15. The eyeglass set of claim 14 wherein the third wall produces elasticity relative to the boss when the cover bridge hook clips over the boss and the curved support mid portion.

16. The eyeglass set of claim 14 wherein the third wall produces elasticity relative to the boss when the cover bridge hook clips over the boss, the curved support mid portion and the base bridge mid portion.

17. The eyeglass set of claim 9 wherein the cover lenses are substantially colored, wherein the substantially colored cover lenses are darker in color than the base lenses.

18. The eyeglass set of claim 9 wherein the cover lenses are substantially identical to the base lenses in lens surface curvature.

19. The eyeglass set of claim 9 wherein the curved support is formed of an elastic material.

20. The eyeglass set of claim 9 wherein the cover lenses are substantially larger than the base lenses, wherein the cover lenses are formed of a polycarbonate material.

* * * * *